Figure 1:
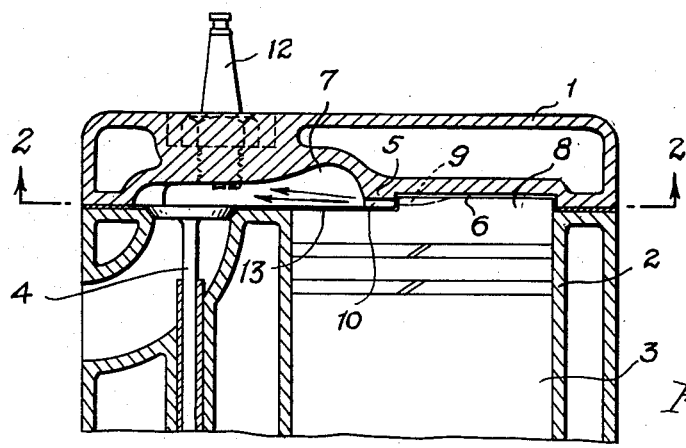

June 6, 1939. J. P. BURKE 2,161,244
INTERNAL COMBUSTION ENGINE CHAMBER
Filed March 16, 1938    2 Sheets-Sheet 1

JAMES P. BURKE
INVENTOR

BY
ATTORNEY

June 6, 1939.   J. P. BURKE   2,161,244
INTERNAL COMBUSTION ENGINE CHAMBER
Filed March 16, 1938    2 Sheets-Sheet 2

JAMES P. BURKE
INVENTOR

BY
ATTORNEY

Patented June 6, 1939

2,161,244

UNITED STATES PATENT OFFICE 2,161,244

INTERNAL COMBUSTION ENGINE CHAMBER

James P. Burke, Knoxville, Tenn., assignor of one-half to F. L. McLaughlin, Detroit, Mich.

Application March 16, 1938, Serial No. 196,102

8 Claims. (Cl. 123—191)

This invention relates to internal combustion engines and particularly to an improved combustion chamber therefor. The main object of the invention is to provide a combustion space formed by the combustion chamber of the cylinder head and the top of the piston which will impart to the fuel charge a high turbulence immediately prior to and at the time of firing in order that a rapid propagation of flame will occur, followed by a substantially complete burning of the fuel during the power stroke.

Another object of the invention is to provide a combustion space formed by the combustion chamber of the cylinder head and the piston which may be considered as forming itself into two connected compartments on the latter part of the piston stroke, the shape being such that the bottom of one compartment is reduced at a very much more rapid rate than that of the other compartment, whereby gases therein are forced into the other compartments at a high velocity, one of these compartments being the ignition chamber and the other the expansion chamber.

Another object of the invention is to provide a combustion space as above described, together with means integral with the combustion chamber roof or with the top of the piston such that the flow of gases from one chamber to the other will be restricted into a small stream or jet, the direction of this jet being directly over and past an ignition device.

A further object is to provide a combustion chamber capable of forming the jet or stream of gases as above described together with means for dividing this stream immediately after passing over the ignition device, thereby setting up two turbulent streams which rotate in opposite directions and which converge over a portion of the top of the piston, this portion of the top of the piston being exposed to the pressures in the firing chamber at all times.

Another object is to provide jetting means for the fuel gases which will act to direct these gases as described prior to firing and which will act also to restrict the flow of gases from the ignition chamber to the compartment above the piston after firing thus accomplishing the dual purpose of delaying the exposition of the complete piston area to the pressure in the ignition chamber and prolonging the period of turbulence of the gases.

A further object of the invention is to show alternate constructions for the piston and for the interior of the cylinder head, thus giving a choice of design in the application of my invention.

Figure 2:
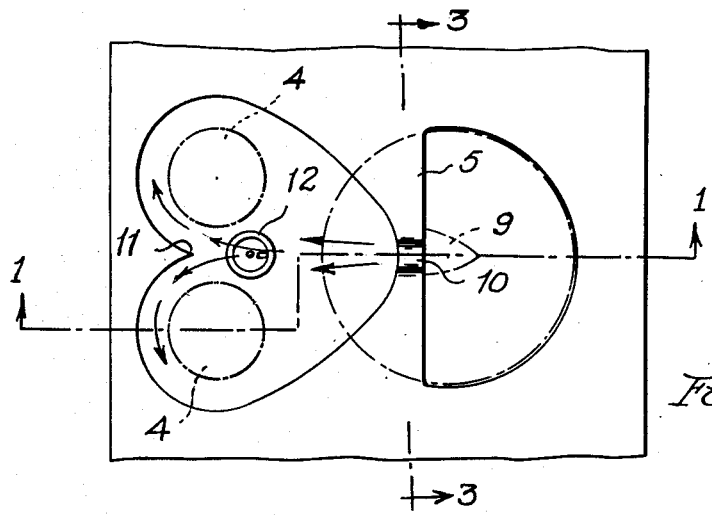
Figure 3:
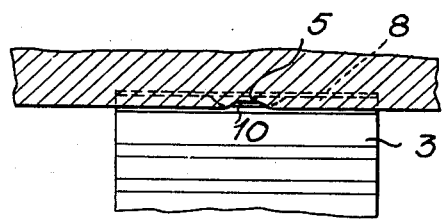
Figure 4:
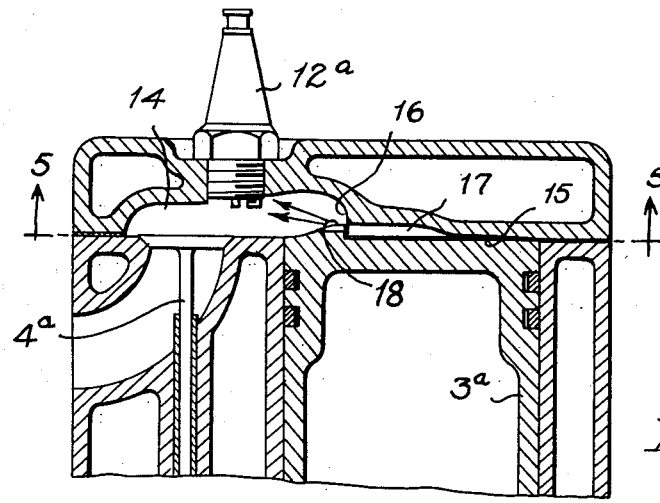
Figure 5:
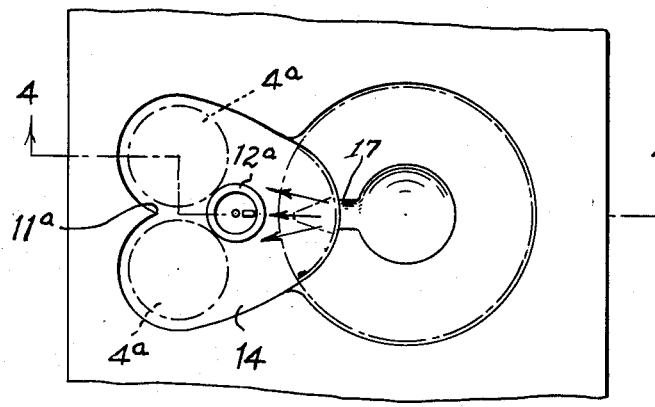
Figure 6:
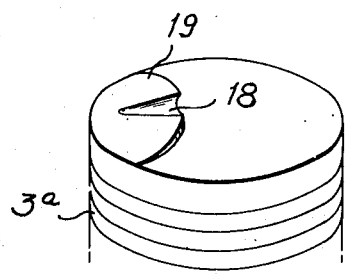

Other objects and advantages will become more fully apparent as reference is had to the accompanying drawings wherein my invention is illustrated and in which:

Fig. 1 is a vertical diametric section through an L-head cylinder showing my invention incorporated therein, Fig. 2 is a bottom plan view of the combustion chamber taken along the line 2—2 of Fig. 1, Fig. 3 is a vertical section of the cylinder head taken along the line 3—3 of Fig. 2, and illustrating the relation of the piston therewith, Fig. 4 is a view similar to Fig. 1 showing a modification of my invention, Fig. 5 is a view similar to Fig. 2 taken along the line 5—5 of Fig. 4, and Fig. 6 is a perspective view of the top of the piston employed in Figs. 4 and 5.

More particularly, I indicates the cylinder head for a cylinder 2 having a piston 3 reciprocally mounted therein, the cylinder head and cylinder being of the L-head type and having the usual poppet valves 4. An ignition device 12 is mounted in the cylinder head I.

The cylinder head I is provided with a depending wall or partition 5 which extends transversely thereacross, dividing the combustion chamber into two compartments, one of which may be considered as an ignition chamber 7 and the other as an expansion chamber 6. The piston 3 has a projection 8 on the top thereof which extends into and which is shaped substantially in counterpart of chamber 6, the shape of both being illustrated as the segment of a circle in plan view. When the piston is in uppermost position, it reduces the volume of this chamber 6 practically to zero and, therefore, does not constitute a combustion chamber. The top of the piston is provided with a tapered channel or groove 9 directly opposite a groove or channel 10 formed by omitting a portion of the wall 5, thus providing a passage for combustion gases from the chamber 6 into the chamber 7 as the piston approaches its uppermost position. These channels 9 and 10 restrict the passage of the gases into and from the chamber 7 in such way that they are fed thereinto in a stream or jet of relatively narrow cross-section. One of these channels 9 or 10 may be omitted without totally destroying the desired effect.

The combustion compartment 7, which is the firing chamber, is of heart shape in bottom plan view, the point of the heart being exposed to the channel 10 of the wall 5. The internal point 11 of the heart is directly opposite and in line with the stream of gases indicated by the arrows in the Figure 2, and between this point 11 and the channel 10 is the ignition device or spark plug 12. Thus as the stream of gases is jetted or emitted from the chamber 6 it passes directly past or over the spark plugs 12, whereupon the stream is divided into two streams, one of which rotates in clockwise direction, as seen in Fig. 2 and the other of which rotates in counter-clockwise direction. The relation of these two streams with respect to the valves 4 is indicated by the dotted valve position in Fig. 2.

It will be noted that a portion of the chamber 7 extends directly over the lower portion 13 of the top of the piston in order that the pressure built up by the fuel gases immediately after firing exerts a downward thrust directly on the piston. As soon as the top of the piston passes below the bottom of the wall 5, there is a further rush of gases over the entire head of the piston and thereafter normal expansion occurs.

In Figs. 4, 5 and 6 a modification is shown, wherein the principles of the invention are employed, but the partition 5 is replaced by a projection on the top of the piston, the combustion chamber compartment immediately above the piston being constructed in such manner as to make this possible, as will now be described. In this case two compartments 14 and 15 are provided, the chamber 15 extending across a portion of the top of the piston and being formed by a portion of the roof of the cylinder head being substantially flattened until it reaches the position 16, where it is turned directly upwardly to form the ignition chamber 14. The compartment 15 is channeled or recessed in its roof at 17 as a means of collecting the fuel gases in the recess 15, as the piston 3a approaches its uppermost position and of directing them in the form of a stream through and past the channel 18 formed in and through a projection 19 on the head of the piston 3a, this projection being exposed directly to the interior of the ignition chamber 14.

In bottom plan view the ignition chamber 14 is of heart shape, the point of the heart overlying the projection 19 and channel 18. The action is similar to that previously described, the fuel gases being emitted in a stream at high velocity from the chamber or compartment 15 through the channel 17 and 18 and over the spark plugs 12a as the piston approaches upper dead center, whereupon the stream is divided by the internal point 11a of the heart into two streams, which rotate in opposite directions over the valves 4a before converging after ignition.

One of the other of the channels 17 or 18 may be omitted, if desired.

In both forms, the gases travel through the restriction formed by the channels after firing, thus delaying the exposition of the top of the piston to the full pressure of the gases in the ignition chamber and thus, also, prolonging the period of turbulence.

Various changes may be made without departing from the period of my invention and I desire to be extended protection within the scope of the appended claims.

What I claim is:

1. A head for the cylinder of an engine, said head having a combustion chamber with a transverse wall depending from the roof thereof directly above the cylinder, and dividing the combustion chamber into two compartments, one of said compartments being heart shaped in bottom plan view with its tip being nearest the other of said compartments, the other of said compartments having the shape of the sector of a circle in bottom plan view, said transverse wall being cut away from the tip of the heart to the interior of said sector to form a restricted passageway between said compartments.

2. A head for the cylinder of an engine, said head having a combustion chamber with a transverse wall depending interiorly from the roof thereof directly above the cylinder, and dividing its combustion chamber into two compartments, one of said compartments being substantially less volume than the other, said wall being omitted for a portion of its length, thereby permitting a flow of combustion gases into said other compartment near the end of the compression stroke and during ignition, said other compartment being shaped to split said flow of gases into oppositely rotating streams.

3. A cylinder head for an engine having a transverse wall depending interiorly from the roof thereof dividing its combustion chamber into two compartments, one of said compartments being substantially less volume than the other, said wall being omitted for a portion of its length thereby permitting a flow of combustion gases into said other compartment near the end of the compression stroke and during ignition, an ignition device in said other compartment directly in the path of said flow of gases, a projection extending into said other compartment from the wall thereof directly opposite the opening through said wall dividing said flow of gases after passing said ignition device.

4. A cylinder head for an engine having a transverse wall depending interiorly from the roof thereof dividing its combustion chamber into two compartments, one of said compartments being substantially less volume than the other, said wall being omitted for a portion of its length thereby permitting a flow of combustion gases into said other compartment near the end of the compression stroke and during ignition, an ignition device in said other compartment directly in the path of said flow of gases, a projection extending into said other compartment from the wall thereof directly opposite the opening through said wall, and an opening having a valve seat on each side of said projection over each of which a portion of said flow of gases is directed in oppositely rotating directions after passing said ignition device.

5. In an L-head engine comprising a cylinder having a piston therein and a cylinder head therefor, a combustion chamber, wall means dividing said combustion chamber into two compartments when the piston approaches its uppermost position, said piston in its uppermost position reducing the volume of the first of said compartments substantially to zero, said wall means having a minor portion thereof omitted and providing a jet-like opening whereby the gases flow from said first compartment past said wall means in a jetted stream at high velocity into the other of said compartments, an ignition device directly in the path of said stream, and means in said second compartment opposite said minor omitted portion dividing said stream into two oppositely rotating streams after passage over said ignition device.

6. In an L-head engine comprising a cylinder having a piston therein and a cylinder head therefor, a combustion chamber defined by the interior walls of said cylinder head having a wall depending therefrom dividing said chamber into two compartments and extending across the top of said cylinder whereby one of said compartments is directly above the top of said piston, and the other of said compartments extends partially thereover, the top of said piston being adapted to substantially reduce the volume of the first named compartment at its uppermost position, said wall being omitted for a minor portion of its length and providing a jet-like opening whereby the gases are expelled from said first mentioned compartment through said wall in a jetted stream at high velocity as said piston approaches its uppermost position, an ignition device in said other compartment directly in said stream, and means in said second compartment opposite said minor omitted portion equally dividing said stream into two oppositely rotating streams after passing said ignition device.

7. In an L-head engine comprising a cylinder having a piston therein and a cylinder head therefor, a combustion chamber defined by the interior walls of said cylinder head having a wall depending therefrom dividing said chamber into two compartments and extending across the top of said cylinder whereby one of said compartments is directly above the top of said piston, and the other of said compartments extends partially thereover, the top of said piston being adapted to substantially reduce the volume of the first named compartment at its uppermost position, said wall being omitted for a minor portion of its length and providing a jet-like opening whereby the gases are expelled from said first mentioned compartment through said wall in a jetted stream at high velocity as said piston approaches its uppermost position, an ignition device in said other compartment directly in the path of said stream, a projection into said combustion chamber in line with said stream dividing said stream into two oppositely rotating streams after passing said ignition device, and engine valves seated in said combustion chamber over each of which one of said streams passes after division.

8. In an internal combustion engine, a cylinder having a piston therein, a cylinder head for said cylinder having a combustion chamber therein, said combustion chamber and piston being shaped to divide said combustion chamber into a first and a second compartment, both of said compartments overlying said cylinder at least in part whereby pressure therein is effective to move the piston on its combustion stroke, an ignition device in the first of said compartments, and a restricted passage between the two compartments providing for a continuous jet progressive flame propagation in the two compartments with ignition in the second compartment slightly delayed with respect to that in the compartment having the ignition device.

JAMES P. BURKE.